US006580406B2

(12) United States Patent
Watanabe

(10) Patent No.: US 6,580,406 B2
(45) Date of Patent: Jun. 17, 2003

(54) POWER CONTROLLING CIRCUIT IN PLASMA DISPLAY UNIT AND METHOD OF CONTROLLING POWER IN THE SAME

(75) Inventor: Takuya Watanabe, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 10/107,057

(22) Filed: Mar. 28, 2002

(65) Prior Publication Data

US 2002/0140640 A1 Oct. 3, 2002

(30) Foreign Application Priority Data

Mar. 29, 2001 (JP) ...................................... 2001-097405

(51) Int. Cl.[7] ................................................ G02F 1/137

(52) U.S. Cl. ....................................... 345/63; 315/169.3

(58) Field of Search ................... 315/167, 169.1–169.4; 345/60, 63, 204, 211, 690

(56) References Cited

U.S. PATENT DOCUMENTS 4,149,184 A * 4/1979 Giddings et al. ............. 358/81
5,274,484 A * 12/1993 Mochizuki et al. ........... 345/87

FOREIGN PATENT DOCUMENTS

| | | | |
|---|---|---|---|
| JP | 1-193797 | A | 8/1989 |
| JP | 5-181430 | A | 7/1993 |
| JP | 2625220 | B2 | 4/1997 |
| JP | 2900997 | B2 | 3/1999 |
| JP | 11-282396 | A | 10/1999 |
| JP | 2000-305514 | A | 11/2000 |
| JP | 2001-13921 | A | 1/2001 |

* cited by examiner

*Primary Examiner*—Don Wong
*Assistant Examiner*—Wilson Lee
(74) *Attorney, Agent, or Firm*—Sughrue Mion, PLLC

(57) ABSTRACT

There is provided a circuit for controlling power in a plasma display unit. The circuit adjusts a display brightness relative to an input image signal in accordance with an external control signal in the plasma display unit. The circuit integrates image signal level in one frame of the input image signal, determines a maximum in the display brightness in accordance with the thus integrated image level, and selects the maximum, if a display brightness defined in accordance with the external control signal is greater than the maximum.

15 Claims, 4 Drawing Sheets

POWER CONTROLLING CIRCUIT IN PLASMA DISPLAY UNIT AND METHOD OF CONTROLLING POWER IN THE SAME

BACKGROUND OF THE INVENTION

1. Field of the Invention

The invention relates to a plasma display unit, and more particularly to a circuit for controlling power in a plasma display unit to prevent overpower in the same.

2. Description of the Related Art

A color plasma display unit is generally controlled such that a brightness is raised when a display load is small, and a brightness is lowered when a display load is high, in order to accomplish both a high peak brightness and low power consumption.

Without such control as mentioned above, there would be caused a problem of very high power consumption when a display load is high, for instance, when a white is displayed in a screen at entirety at a maximum level.

As one of methods of controlling power consumption in a plasma display unit, there is known a method including the step of transmitting a brightness control signal to a plasma display unit independently of an input image signal, to thereby control power consumption in accordance with the brightness control signal.

However, this method is accompanied with a problem that if a brightness control signal having been input into a plasma display unit were not in a proper range, the plasma display unit might operate in a range beyond a safe operation range.

Hence, a plasma display unit has been required to have a function of protecting the plasma display unit from overpower, by which power is reduced, if power to be consumed corresponding to a brightness control signal is over rated power in a plasma display unit, and preferentially takes an external brightness control signal, if power to be consumed corresponding to a brightness control signal is within rated power.

As one of solutions for protecting a plasma display unit from overpower, those skilled in the art might suggest a method in which a power source current is detected, and a brightness is controlled in accordance with the detected power source current in order to prevent a over-current from running through a plasma display unit.

This method inevitably includes a feedback control, because a brightness is controlled after a power source current has been detected.

However, a feedback control is inevitably accompanied with control delay. Hence, some frames might instantaneously receive overpower, resulting in that a power source has to be designed to be able to withstand such an instantaneous overpower. As a result, the above-mentioned method causes a problem of an increase in burden in designing a plasma display unit.

For instance, Japanese Unexamined Patent Publication No. 1-193797 (A) has suggested a plasma display unit including a spontaneously light-emitting device and a drive circuit for driving the spontaneously light-emitting device, wherein the drive circuit includes first means for detecting a volume to be displayed in the spontaneously light-emitting device, and second means for suppressing an increase in the volume, based on an output signal transmitted from the first means.

Japanese Patent No. 2625220 (B2) has suggested an image display unit which adjusts a brightness of an image in a frame by means of a control circuit, wherein the control circuit divides a frame into a first period in which an image is to be displayed and which is comprised of a plurality of weighted sub-fields, and a second period in which a brightness is to be adjusted. A brightness of an image is controlled by varying a length of the second period in a frame without changing a weighting ratio among the plurality of sub-fields.

Japanese Patent No. 2900997 (B2) has suggested a method of controlling power consumption in a display unit, including the steps of measuring power consumption in a display unit, increasing a brightness in the display unit in accordance with the power consumption or decreasing a brightness at a rate different from a rate at which the brightness is increased, integrating the power consumption, and controlling a brightness in accordance with the thus integrated power consumption to thereby limit the power consumption below a target power.

Japanese Unexamined Patent Publication No. 2000-305514 (A) has suggested a plasma display panel including first means for detecting an average of input image signals, second means for controlling a brightness in accordance with a signal transmitted from the first means, and third means for driving a plasma display panel to display images in accordance with a signal transmitted from the second means. The plasma display panel makes it possible to make power consumption constant, even if the average of input image signals were varied.

Japanese Unexamined Patent Publication No. 2001-13921 (A) has suggested an apparatus for driving a plasma display panel including a plurality of cells arranged in a matrix. The apparatus displays images at an intermediate tone brightness by dividing a unit display period into a light-emitting period and a non-light-emitting period, and repeatedly turning the cells on only in the light-emitting period. The apparatus calculates average power consumption by adding an average picture level of the input image signal to power having been consumed in the non-light-emitting period, and controls power consumption of the plasma display panel in accordance with the average power consumption.

Japanese Unexamined Patent Publication No. 5-181430 (A) has suggested an apparatus for controlling a power source in a portable computer, including an AC adapter through which power is supplied, a rechargeable battery, a charging circuit for charging the battery, first means for determining whether the battery is charged, second means connected to the first means for storing the determination made by the first means, third means for reading the selection stored in the second means, and producing and transmitting a command indicative of what is read out, when the portable computer is turned on, and fourth means for controlling the charging circuit in accordance with the command.

Japanese Unexamined Patent Publication No. 11-282396 (A) has suggested a method of controlling power consumption in a display unit, including the steps of (a) calculating a load factor of a screen, based on display data transmitted to the display unit, (b) measuring power consumed in the display unit, and (c) controlling a brightness in the screen in accordance with both the load factor calculated in the step (a) and the power measured in the step (b).

However, the above-mentioned problems remain unsolved even in the above-mentioned publications.

SUMMARY OF THE INVENTION

In view of the above-mentioned problems in the conventional power controlling circuits in a plasma display unit, it is an object of the present invention to provide a power controlling circuit which is capable of accomplishing power control without delay, preventing instantaneous overpower, and significantly relaxing requirements to a power source.

In one aspect of the present invention, there is provided a circuit for controlling power in a plasma display unit, wherein the circuit adjusts a display brightness relative to an input image signal in accordance with an external control signal in the plasma display unit, and the circuit integrates image signal level in one frame of the input image signal, determines a maximum in the display brightness in accordance with the thus integrated image level, and selects the maximum, if a display brightness defined in accordance with the external control signal is greater than the maximum.

For instance, the circuit may select the display brightness defined in accordance with the external control signal, if the display brightness defined in accordance with the external control signal is not greater than the maximum.

There is further provided a circuit for controlling power in a plasma display unit, wherein the circuit adjusts a display brightness relative to an input image signal in accordance with an external control signal in the plasma display unit, the circuit determines a maximum in a maintenance pulse number, based on both a value obtained by integrating image signal level in one frame of an input image signal, and a temperature at a part of the plasma display unit which part radiates heat influencing an effective maintenance frequency, and the circuit selects the maximum, if a maintenance pulse number defined in accordance with the external control signal is greater than the maximum.

For instance, the circuit may select the maintenance pulse number defined in accordance with the external control signal, if the maintenance pulse number defined in accordance with the external control signal is not greater than the maximum.

There is further provided a circuit for controlling power in a plasma display unit, including (a) a first circuit which receives an average picture level (APL) signal generated by integrating portions for displaying images in image signals input into the plasma display unit, frame by frame, determines an upper limit of an effective maintenance frequency, allowable to the average picture level, and transmits a first signal indicative of the upper limit, and (b) a comparator which receives both the first signal and a control signal in accordance with which a display brightness is controlled, compares the control signal and the first signal to each other, selects one of them which presents a smaller effective maintenance frequency, and outputs the thus selected signal as a signal used for controlling a brightness in the plasma display unit.

There is further provided a circuit for controlling power in a plasma display unit, including (a) a thermal sensor which detects a temperature at a part of the plasma display unit which part radiates heat influencing an effective maintenance frequency, and transmits a first signal indicative of the temperature, (b) a first circuit which receives both the first signal and an average picture level (APL) signal generated by integrating portions for displaying images in image signals input into the plasma display unit, frame by frame, determines an allowable upper limit of an effective maintenance frequency, based on both the average picture level and the first signal, and transmits a second signal indicative of the allowable upper limit, and (c) a comparator which receives both the second signal and a control signal in accordance with which a display brightness is controlled, compares the control signal and the second signal to each other, selects one of them which presents a smaller effective maintenance frequency, and outputs the thus selected signal as a signal used for controlling a brightness in the plasma display unit.

There is further provided a circuit for controlling power in a plasma display unit, including (a) a plurality of thermal sensors each of which detects a temperature at a part of the plasma display unit which part radiates heat influencing an effective maintenance frequency; and transmits a first signal indicative of the temperature, (b) a first circuit which receives both the first signals and an average picture level (APL) signal generated by integrating portions for displaying images in image signals input into the plasma display unit, frame by frame, selects a maximum temperature among temperatures indicated by the first signals, determines an allowable upper limit of an effective maintenance frequency, based on both the average picture level and the maximum temperature, and transmits a second signal indicative of the allowable upper limit, and (c) a comparator which receives both the second signal and a control signal in accordance with which a display brightness is controlled, compares the control signal and the second signal to each other, selects one of them which presents a smaller effective maintenance frequency, and outputs the thus selected signal as a signal used for controlling a brightness in the plasma display unit.

In another aspect of the present invention, there is provided a plasma display unit including any one of the above-mentioned circuits for controlling power in the plasma display unit.

In still another aspect of the present invention, there is provided a method of controlling power in a plasma display unit which is capable of adjusting a display brightness relative to an input image signal in accordance with an external control signal, the method including the steps of (a) integrating image signal level in one frame of the input image signal, and determining a maximum in the display brightness in accordance with the thus integrated image level, (b) comparing the maximum and a display brightness defined in accordance with the external control signal, and (c) selecting the maximum, if the display brightness defined in accordance with the external control signal is greater than the maximum, and selecting the display brightness defined in accordance with the external control signal, if the display brightness defined in accordance with the external control signal is not greater than the maximum.

There is further provided a method of controlling power in a plasma display unit which is capable of adjusting a display brightness relative to an input image signal in accordance with an external control signal, the method including the steps of (a) determining a maximum in a maintenance pulse number, based on both a value obtained by integrating image signal level in one frame of an input image signal, and a temperature at a part of the plasma display unit which part radiates heat influencing an effective maintenance frequency, (b) comparing the maximum and a maintenance pulse number defined in accordance with the external control signal to each other, and (c) selecting the maximum, if the maintenance pulse number defined in accordance with the external control signal is greater than the maximum, and selecting the display brightness defined in accordance with the external control signal, if the maintenance pulse number defined in accordance with the external control signal is not greater than the maximum.

There is further provided a method of controlling power in a plasma display unit which is capable of adjusting a display brightness relative to an input image signal in accordance with an external control signal, the method including the steps of (a) detecting temperatures at parts of the plasma display unit which parts radiate heat influencing an effective maintenance frequency, (b) selecting a maximum temperature among the temperatures, (c) determining a maximum in a maintenance pulse number, based on both a value obtained by integrating image signal level in one frame of an input image signal, and the maximum temperature, (d) comparing the maximum and a maintenance pulse number defined in accordance with the external control signal to each other, and (e) selecting the maximum, if the maintenance pulse number defined in accordance with the external control signal is greater than the maximum, and selecting the display brightness defined in accordance with the external control signal, if the maintenance pulse number defined in accordance with the external control signal is not greater than the maximum.

The advantages obtained by the aforementioned present invention will be described hereinbelow.

In accordance with the present invention, even if an inaccurate brightness control signal is input into a plasma display unit, it would be possible to limit power consumed in a plasma display unit into an allowable range to be followed for ensuring safety in operation. In other words, it would be possible to avoid power to be consumed in a plasma display unit from becoming excessive power.

In addition, since the present invention can accomplish power control without delay relative to fluctuation in an image signal, it would be possible to prevent instantaneous overpower caused by control delay.

Furthermore, it would be possible to accomplish optimal power control, taking into consideration a part or parts of a plasma display unit which part or parts radiate(s) heat much influencing an effective maintenance frequency.

The above and other objects and advantageous features of the present invention will be made apparent from the following description made with reference to the accompanying drawings, in which like reference characters designate the same or similar parts throughout the drawings.

DESCRIPTION OF THE PREFERRED EMBODIMENTS

Preferred embodiments in accordance with the present invention will be explained hereinbelow with reference to drawings.

[First Embodiment]

Figure 1:
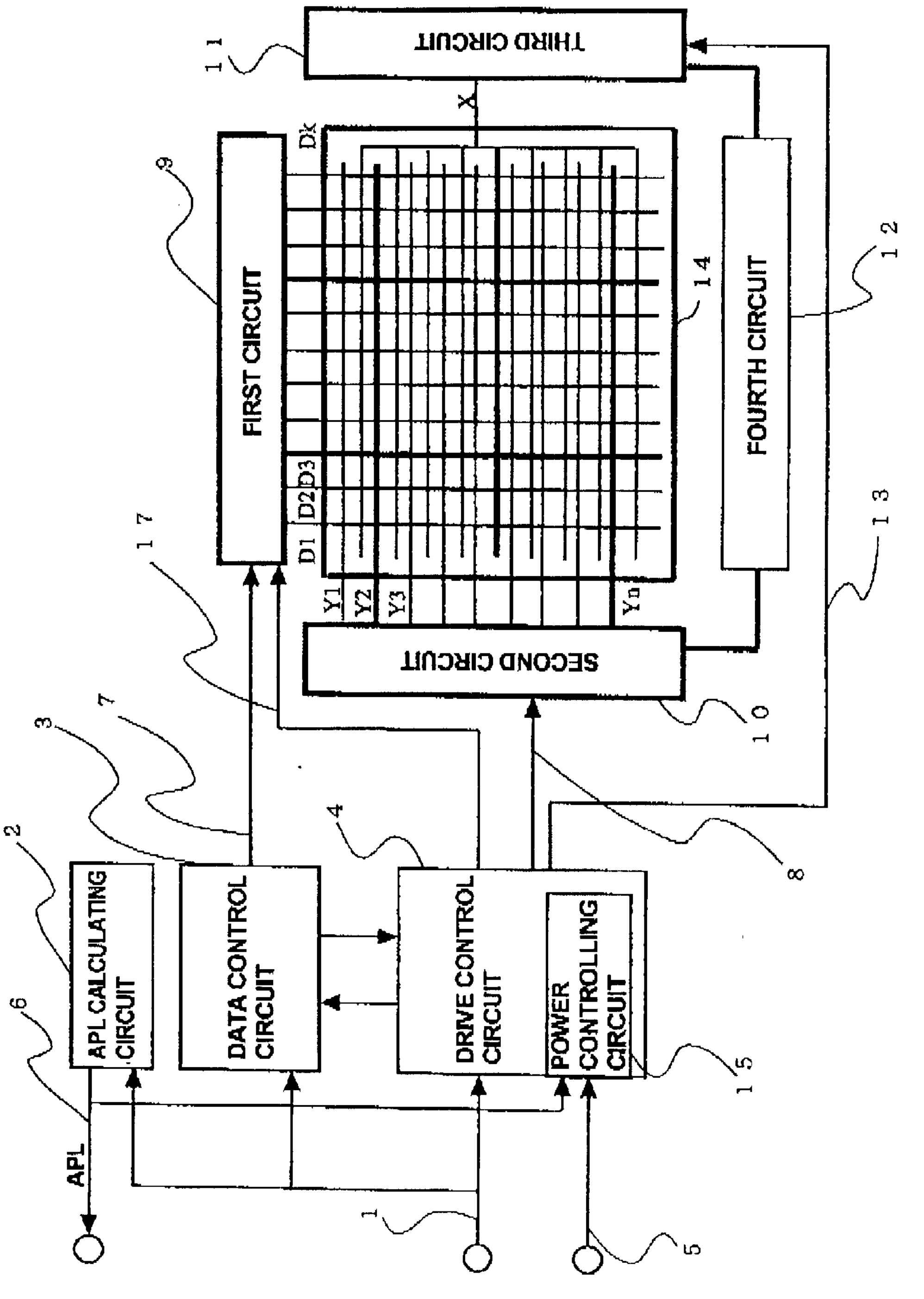
FIG. 1 is a block diagram of a plasma display unit including a power controlling circuit in accordance with the first embodiment of the present invention.

FIG. 1 is, a block diagram of a plasma display unit including a power controlling circuit 15 in accordance with the first embodiment of the present invention.

The plasma display unit includes not only the power controlling circuit 15, but also an APL calculating circuit 2 which calculates an average picture level (APL), a data control circuit 3, a drive control circuit 4, a first circuit 9 for driving data electrodes, a second circuit 10 for driving scanning electrodes, a third circuit 11 for driving maintenance electrodes, a fourth circuit 12 for collecting electric charges, and a plasma display panel (PDP) 14.

The power controlling circuit 15 is equipped in the drive control circuit 4.

The APL calculating circuit 2 receives an input image signal 1, integrates and normalizes a portion of the received input image signal 1 which portion contributes to displaying images, frame by frame, and transmits an average picture level signal 6. The average picture level signal 6 is input into the power controlling circuit 15, and further transmitted externally of the plasma display unit for generating a brightness control signal 5.

In the calculation of the average picture level signal 6 in the APL calculating circuit 2, there is caused one frame delay. However, data delay is caused by one frame or more in the data control circuit 3. Hence, delays caused in the average picture level signal 6 and the data control circuit 3 are cancelled each other.

The data control circuit 3 receives the input image signal 1, and transmits a data signal 7 to the first circuit 9.

The drive control circuit 4 receives the input image signal 1, and transmits a data enabling signal 17 to the first circuit 9, a first control signal 8 for controlling the second circuit 10, to the second circuit 10, and a second control signal 13 for controlling the third circuit 11, to the third circuit 11, respectively.

The first circuit 9 receives the data signal 7 from the data control circuit 3 and the data enabling signal 17 from the drive control circuit 4, and drives data electrodes in each of liquid crystal display devices constituting the plasma display panel 14, in accordance with the received signals 7 and 17.

The second circuit 10 drives scanning electrodes constituting the plasma display panel 14, in accordance with the first control signal 8 received from the drive control signal 4.

The third circuit 11 drives maintenance electrodes constituting the plasma display panel 14, in accordance with the second control signal 13 received from the drive control signal 4.

The fourth circuit 12 collects electric charges generated in the first and third circuits 10 and 11.

Figure 2:
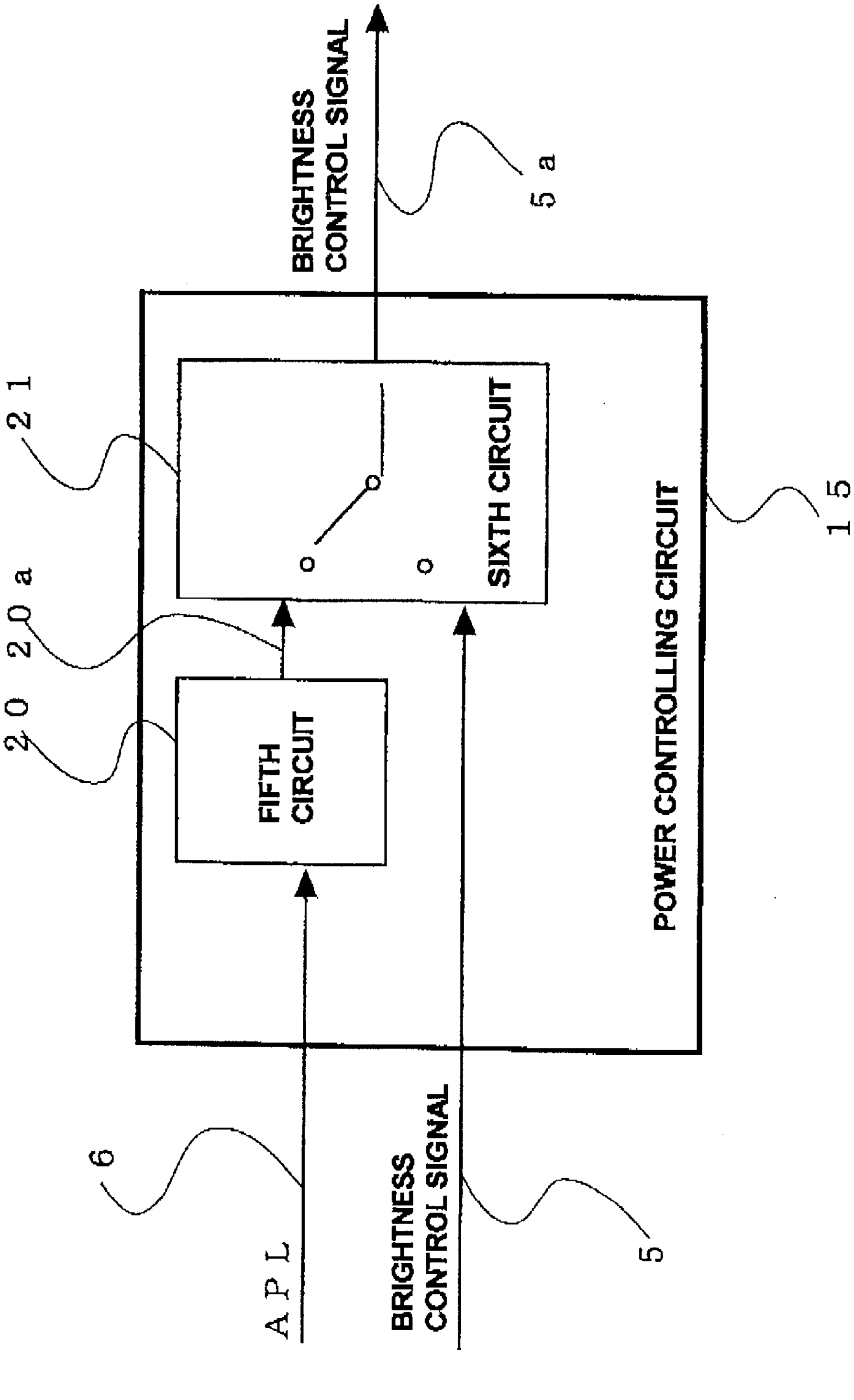
FIG. 2 is a block diagram of a power controlling circuit in accordance with the first embodiment.

FIG. 2 is a block diagram of the power controlling circuit 15.

The power controlling circuit 15 is comprised of a fifth circuit 20 for determining an upper limit in an effective maintenance frequency, and a sixth circuit 21 for comparing two signals to each other.

The fifth circuit 20 receives the average picture level signal 6, and determines an upper limit of an effective maintenance frequency, allowable to the received average picture level 6, and transmits a first signal **20*a*** indicative of the thus determined upper limit.

The sixth circuit 21 receives both the first signal **20*a* and the brightness control signal 5, compares the first signal 20*a* and the brightness control signal 5 to each other, selects one of them which presents a smaller effective maintenance frequency, and outputs the thus selected signal as a brightness control signal 5*a***.

Hereinbelow is explained an operation of the power controlling circuit 15 in accordance with the first embodiment.

The fifth circuit 20 receives the average picture level signal 6, and determines an upper limit of an effective maintenance frequency which upper limit is within an allowable range to the received average picture level 6, and transmits the first signal 20*a* indicative of the thus determined upper limit to the sixth circuit 21.

The sixth circuit 21 receives the brightness control signal 5 and the first signal 20*a*. The sixth circuit 21 compares those signals 5 and 20*a* to each other, selects one of the signals 5 and 20*a* which presents a smaller effective maintenance frequency, and outputs the thus selected signal 5 or 20*a* to the drive control circuit 4 as the brightness control signal 5*a*.

As mentioned above, the power control circuit 15 in accordance with the first embodiment outputs the brightness control signal 5*a* indicative of the upper limit, if the received brightness control signal 5 is greater than the upper limit of an effective maintenance frequency, and outputs the brightness control signal 5 as the brightness control signal 5*a*, if the received brightness control signal 5 is not greater than the upper limit of an effective maintenance frequency.

Hence, even if the power controlling circuit 15 receives an inaccurate brightness control signal 5, the brightness control signal 5*a* output from the power controlling circuit 15 would never be greater than an effective maintenance frequency defined by the first signal 20*a*, ensuring that overpower is not supplied to the first and third circuits 10 and 11.

The power controlling circuit 15 in accordance with the first embodiment provides advantages as follows.

The first advantage is that it would be possible to limit power consumed by a plasma display unit into an allowable range to be followed to ensure safety in operation, even if the power controlling circuit received an inaccurate brightness control signal. Hence, a plasma display unit could be protected from destruction or overheating caused by supplying overpower thereto.

The second advantage is that since the power controlling circuit 15 in accordance with the first embodiment can accomplish power control without delay relative to fluctuation in an image signal, unlike a method of controlling power by detecting a power source current, the power controlling circuit 15 could prevent instantaneous overpower caused by control delay, during carrying out power control.

[Second Embodiment]

Figure 3:
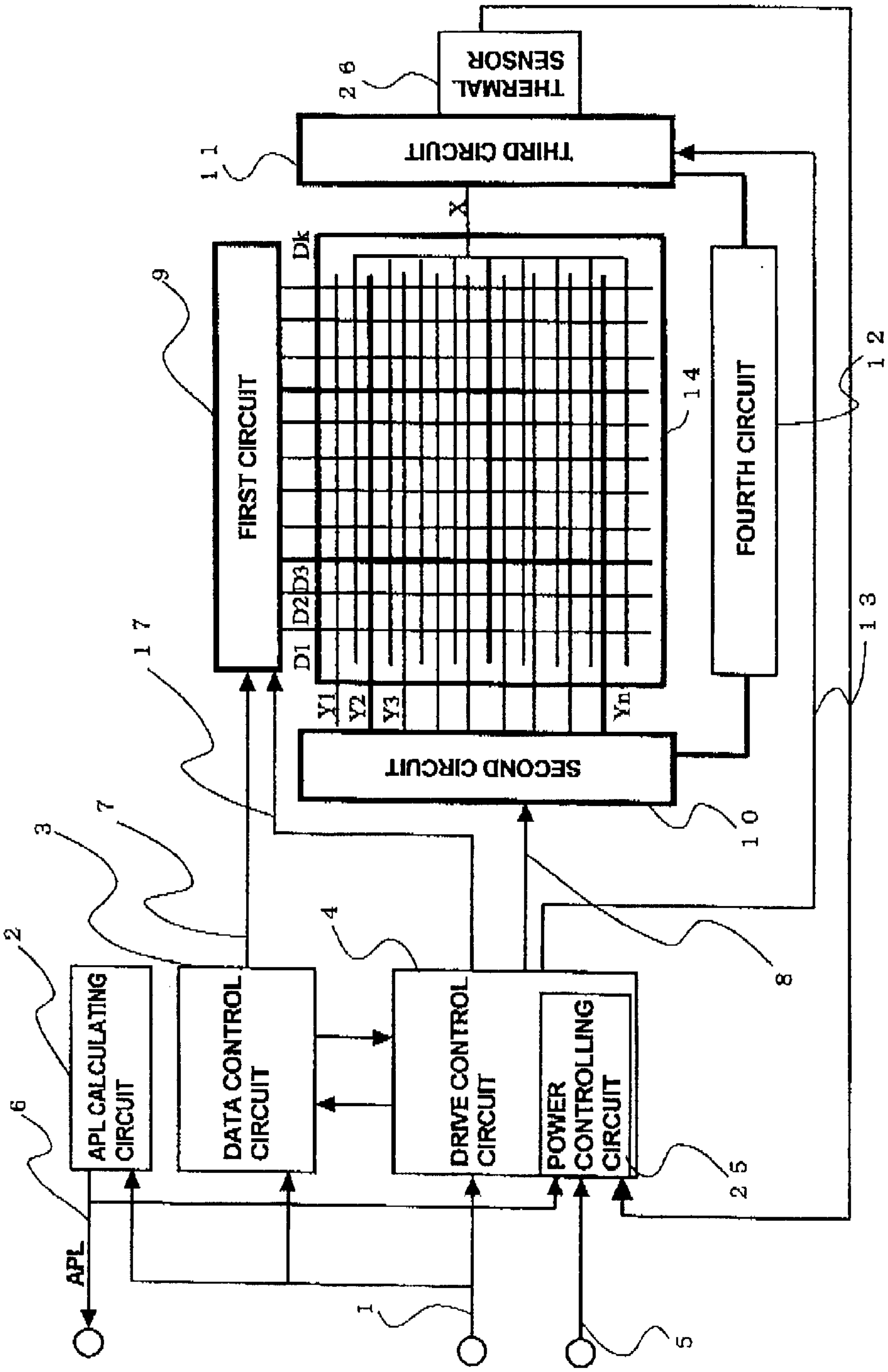
FIG. 3 is a block diagram of a plasma display unit including a power controlling circuit in accordance with the second embodiment of the present invention.

FIG. 3 is a block diagram of a plasma display unit including a power controlling circuit 25 in accordance with the second embodiment of the present invention.

The plasma display unit illustrated in FIG. 3 has the same structure as the structure of the plasma display unit illustrated in FIG. 1 except including the power controlling circuit 25 in place of the power controlling circuit 15.

The power controlling circuit 25 in accordance with the second embodiment additionally includes a thermal sensor 26 fixed to the third circuit 11, as well as the parts constituting the power controlling circuit 15 in accordance with the first embodiment 15.

The thermal sensor 26 detects a temperature of the third circuit 11, and transmits a second signal 26*a* indicative of the detected temperature, to the fifth circuit 30.

Figure 4:
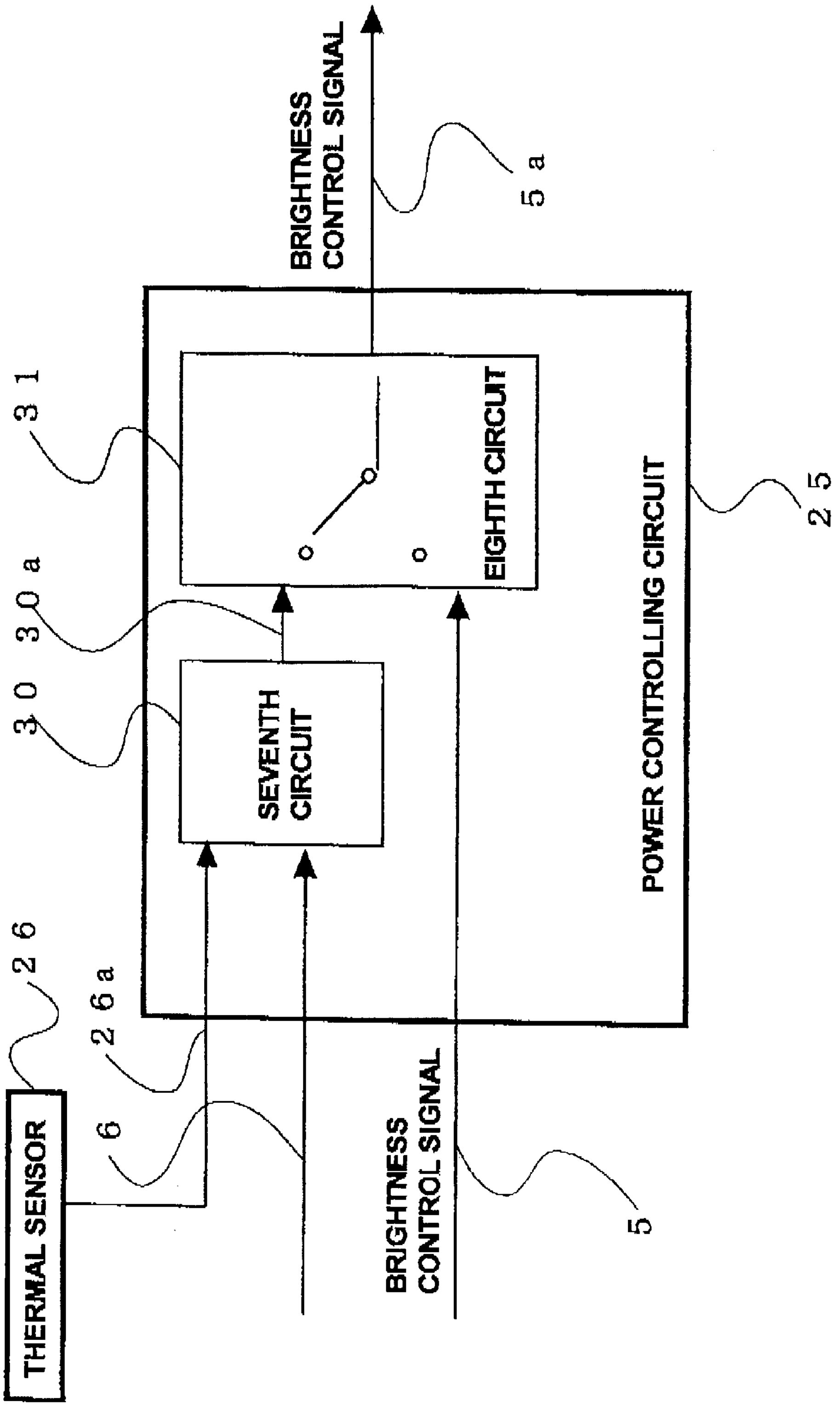
FIG. 4 is a block diagram of a power controlling circuit in accordance with the second embodiment.

FIG. 4 is a block diagram of the power controlling circuit 25 in accordance with the second embodiment.

The power controlling circuit 25 is comprised of a seventh circuit 30 for determining an upper limit in an effective maintenance frequency, and a seventh circuit 31 for comparing two signals to each other.

The seventh circuit 30 receives both the average picture level signal 6 and the second signal 26*a*, determines an upper limit of an effective maintenance frequency, allowable to the received average picture level 6, based on both the average picture level signal 6 and the second signal 26*a*, and transmits a third signal 30*a* indicative of the thus determined upper limit.

The eighth circuit 31 receives both the third signal 30*a* and the brightness control signal 5, compares the third signal 30*a* and the brightness control signal 5 to each other, selects one of them which presents a smaller effective maintenance frequency, and outputs the thus selected signal as a brightness control signal 5*a*.

Hereinbelow is explained an operation of the power controlling circuit 25 in accordance with the second embodiment.

The seventh circuit 30 receives both the average picture level signal 6 and the second signal 26*a*, determines an upper limit of an effective maintenance frequency, allowable to the received average picture level 6, based on both the average picture level signal 6 and the second signal 26*a*, and outputs the third signal 30*a* indicative of the thus determined upper limit.

The third signal 30*a* is transmitted to the eighth circuit 31 from the seventh circuit 80.

The eighth circuit 31 receives both the third signal 30*a* and the brightness control signal 5, compares the third signal 30*a* and the brightness control signal 5 to each other, selects one of them which presents a smaller effective maintenance frequency, and outputs the thus selected signal as a brightness control signal 5*a* to the drive control circuit 4.

As mentioned above, the power control circuit 25 in accordance with the second embodiment outputs the brightness control signal 5*a* indicative of the upper limit, if the received brightness control signal 5 is greater than the upper limit of an effective maintenance frequency, and outputs the received brightness control signal 5 as the brightness control signal 5*a*, if the received brightness control signal 5 is not greater than the upper limit of an effective maintenance frequency.

Hence, even if the power controlling circuit 25 receives an inaccurate brightness control signal 5, the brightness control signal 5*a* output from the power controlling circuit 25 would never be greater than an effective maintenance frequency defined by the third signal 30*a*, ensuring that overpower is not supplied to the first and third circuits 10 and 11.

In particular, since the power controlling circuit 25 in accordance with the second embodiment receives an output transmitted from the thermal sensor 26, indicative of a temperature of the third circuit 11, as one of parameters to be used for an upper limit of an effective maintenance frequency, the power controlling circuit 25 could accomplish optimal power control reflecting an atmosphere temperature around a plasma display unit and a temperature of a part of a plasma display unit.

Though the thermal sensor 26 is designed to be fixed to the third circuit 11 in the second embodiment, a part to which the thermal sensor 26 is to be fixed is not to be limited to the third circuit 11. The thermal sensor 26 may be fixed to any part of a plasma display unit, if the part radiates heat which much influences an effective maintenance frequency.

For instance, the thermal sensor 26 may be fixed to the second circuit 10, the fourth circuit 12 or the plasma display panel 14.

[Third Embodiment]

The power controlling circuit 25 in accordance with the above-mentioned second embodiment is designed to include one thermal sensor 26. However, a power controlling circuit in accordance with the third embodiment is designed to include a plurality of thermal sensors. The power controlling circuit in accordance with the third embodiment is designed to have the same structure as the structure of the power controlling circuit 25 in accordance with the second embodiment except that the power controlling circuit in accordance with the third embodiment is designed to include a plurality of thermal sensors in place of the thermal sensor 26 in the second embodiment.

Each of the thermal sensors is fixed to a part of a plasma display unit which part radiates heat which much influences an effective maintenance frequency, detects a temperature at the part, and transmits a fourth signal indicative of the thus detected temperature to the seventh circuit 30.

For instance, the thermal sensors may be fixed to any two or more of the first to fourth circuits 9 to 12.

The seventh circuit 30 receives both the average picture level signal 6 and a plurality of the fourth signals, selects a maximum temperature among temperatures indicated by the fourth signals, determines an upper limit of an effective maintenance frequency, allowable to the received average picture level 6, based on both the average picture level signal 6 and the maximum temperature, and outputs the third signal 30*a* indicative of the thus determined upper limit.

The third signal 30*a* is transmitted to the eighth circuit 31 from the seventh circuit 30.

The eighth circuit 31 receives both the third signal 30*a* and the brightness control signal 5, compares the third signal 30*a* and the brightness control signal 5 to each other, selects one of them which presents a smaller effective maintenance frequency, and outputs the thus selected signal as a brightness control signal 5*a* to the drive control circuit 4.

As mentioned above, the power control circuit in accordance with the third embodiment outputs the brightness control signal 5*a* indicative of the upper limit, if the received brightness control signal 5 is greater than the upper limit of an effective maintenance frequency, and outputs the received brightness control signal 6 as the brightness control signal 5*a*, if the received brightness control signal 5 is not greater than the upper limit of an effective maintenance frequency.

Hence, even if the power controlling circuit receives an inaccurate brightness control signal 5, the brightness control signal 5*a* output from the power controlling circuit 25 would never be greater than an effective maintenance frequency defined by the third signal 30*a*, ensuring that overpower is not supplied to the first and third circuits 10 and 11.

Thus, the power controlling circuit in accordance with the third embodiment provides the same advantages as those provided by the power controlling circuit in accordance with the second embodiment.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

The entire disclosure of Japanese Patent Application No. 2001-097405 filed on Mar. 29, 2001 including specification, claims, drawings and summary is incorporated herein by reference in its entirety.

What is claimed is:

1. A circuit for controlling power in a plasma display unit, wherein said circuit adjusts a display brightness relative to an input image signal in accordance with an external control signal in said plasma display unit, and said circuit integrates image signal level in one frame of said input image signal, determines a maximum in said display brightness in accordance with the thus integrated image level, and selects said maximum, if a display brightness defined in accordance with said external control signal is greater than said maximum.

2. The circuit as set forth in claim 1, wherein said circuit selects said display brightness defined in accordance with said external control signal, if said display brightness defined in accordance with said external control signal is not greater than said maximum.

3. A circuit for controlling power in a plasma display unit, wherein said circuit adjusts a display brightness relative to an input image signal in accordance with an external control signal in said plasma display unit, said circuit determines a maximum in a maintenance pulse number, based on both a value obtained by integrating image signal level in one frame of an input image signal, and a temperature at a part of said plasma display unit which part radiates heat influencing an effective maintenance frequency, and said circuit selects said maximum, if a maintenance pulse number defined in accordance with said external control signal is greater than said maximum.

4. The circuit as set forth in claim 3, wherein said circuit selects said maintenance pulse number defined in accordance with said external control signal, if said maintenance pulse number defined in accordance with said external control signal is not greater than said maximum.

5. A circuit for controlling power in a plasma display unit, comprising:

(a) a first circuit which receives an average picture level (APL) signal generated by integrating portions for displaying images in image signals input into said plasma display unit, frame by frame, determines an upper limit of an effective maintenance frequency, allowable to said average picture level, and transmits a first signal indicative of said upper limit; and (b) a comparator which receives both said first signal and a control signal in accordance with which a display brightness is controlled, compares said control signal and said first signal to each other, selects one of them which presents a smaller effective maintenance frequency, and outputs the thus selected signal as a signal used for controlling a brightness in said plasma display unit.

6. A circuit for controlling power in a plasma display unit, comprising:

(a) a thermal sensor which detects a temperature at a part of said plasma display unit which part radiates heat influencing an effective maintenance frequency, and transmits a first signal indicative of said temperature;

(b) a first circuit which receives both said first signal and an average picture level (APL) signal generated by integrating portions for displaying images in image signals input into said plasma display unit, frame by frame, determines an allowable upper limit of an effective maintenance frequency, based on both said average picture level and said first signal, and transmits a second signal indicative of said allowable upper limit; and (c) a comparator which receives both said second signal and a control signal in accordance with which a display brightness is controlled, compares said control signal and said second signal to each other, selects one of them which presents a smaller effective maintenance frequency, and outputs the thus selected signal as a signal used for controlling a brightness in said plasma display unit.

7. A circuit for controlling power in a plasma display unit, comprising:

(a) a plurality of thermal sensors each of which detects a temperature at a part of said plasma display unit which part radiates heat influencing an effective maintenance frequency, and transmits a first signal indicative of said temperature;

(b) a first circuit which receives both said first signals and an average picture level (APL) signal generated by integrating portions for displaying images in image signals input into said plasma display unit, frame by frame, selects a maximum temperature among temperatures indicated by said first signals, determines an allowable upper limit of an effective maintenance frequency, based on both said average picture level and said maximum temperature, and transmits a second signal indicative of said allowable upper limit; and (c) a comparator which receives both said second signal and a control signal in accordance with which a display brightness is controlled, compares said control signal and said second signal to each other, selects one of them which presents a smaller effective maintenance frequency, and outputs the thus selected signal as a signal used for controlling a brightness in said plasma display unit.

8. A plasma display unit including a circuit for controlling power in said plasma display unit, wherein said circuit adjusts a display brightness relative to an input image signal in accordance with an external control signal in said plasma display unit, and said circuit integrates image signal level in one frame of said input image signal, determines a maximum in said display brightness in accordance with the thus integrated image level, and selects said maximum, if a display brightness defined in accordance with said external control signal is greater than said maximum.

9. A plasma display unit including a circuit for controlling power in said plasma display unit, wherein said circuit adjusts a display brightness relative to an input image signal in accordance with an external control signal in said plasma display unit, said circuit determines a maximum in a maintenance pulse number, based on both a value obtained by integrating image signal level in one frame of an input image signal, and a temperature at a part of said plasma display unit which part radiates heat influencing an effective maintenance frequency, and said circuit selects said maximum, if a maintenance pulse number defined in accordance with said external control signal is greater than said maximum.

10. A plasma display unit including a circuit for controlling power in said plasma display unit, said circuit comprising:

(a) a first circuit which receives an average picture level (APL) signal generated by integrating portions for displaying images in image signals input into said plasma display unit, frame by frame, determines an upper limit of an effective maintenance frequency, allowable to said average picture level, and transmits a first signal indicative of said upper limit; and (b) a comparator which receives both said first signal and a control signal in accordance with which a display brightness is controlled, compares said control signal and said first signal to each other, selects one of them which presents a smaller effective maintenance frequency, and outputs the thus selected signal as a signal used for controlling a brightness in said plasma display unit.

11. A plasma display unit including a circuit for controlling power in said plasma display unit, said circuit comprising:

(a) a thermal sensor which detects a temperature at a part of said plasma display unit which part radiates heat influencing an effective maintenance frequency, and transmits a first signal indicative of said temperature;

(b) a first circuit which receives both said first signal and an average picture level (APL) signal generated by integrating portions for displaying images in image signals input into said plasma display unit, frame by frame, determines an allowable upper limit of an effective maintenance frequency, based on both said average picture level and said first signal, and transmits a second signal indicative of said allowable upper limit; and (c) a comparator which receives both said second signal and a control signal in accordance with which a display brightness is controlled, compares said control signal and said second signal to each other, selects one of them which presents a smaller effective maintenance frequency, and outputs the thus selected signal as a signal used for controlling a brightness in said plasma display unit.

12. A plasma display unit including a circuit for controlling power in said plasma display unit, said circuit comprising:

(a) a plurality of thermal sensors each of which detects a temperature at a part of said plasma display unit which part radiates heat influencing an effective maintenance frequency, and transmits a first signal indicative of said temperature;

(b) a first circuit which receives both said first signals and an average picture level (APL) signal generated by integrating portions for displaying images in image signals input into said plasma display unit, frame by frame, selects a maximum temperature among temperatures indicated by said first signals, determines an allowable upper limit of an effective maintenance frequency, based on both said average picture level and said maximum temperature, and transmits a second signal indicative of said allowable upper limit; and (c) a comparator which receives both said second signal and a control signal in accordance with which a display brightness is controlled, compares said control signal and said second signal to each other, selects one of them which presents a smaller effective maintenance frequency, and outputs the thus selected signal as a signal used for controlling a brightness in said plasma display unit.

13. A method of controlling power in a plasma display unit which is capable of adjusting a display brightness relative to au input image signal in accordance with an external control signal, said method comprising the steps of:

(a) integrating image signal level in one frame of said input image signal, and determining a maximum in said display brightness in accordance with the thus integrated image level;

(b) comparing said maximum and a display brightness defined in accordance with said external control signal; and (c) selecting said maximum, if said display brightness defined in accordance with said external control signal is greater than said maximum, and selecting said display brightness defined in accordance with said external control signal, if said display brightness defined in accordance with said external control signal is not greater than said maximum.

14. A method of controlling power in a plasma display unit which is capable of adjusting a display brightness relative to an input image signal in accordance with an external control signal, said method comprising the steps of:

(a) determining a maximum in a maintenance pulse number, based on both a value obtained by integrating image signal level in one frame of an input image signal, and a temperature at a part of said plasma display unit which part radiates heat influencing an effective maintenance frequency;

(b) comparing said maximum and a maintenance pulse number defined in accordance with said external control signal to each other; and (c) selecting said maximum, if said maintenance pulse number defined in accordance with said external control signal is greater than said maximum, and selecting said display brightness defined in accordance with said external control signal, if said maintenance pulse number defined in accordance with said external control signal is not greater than said maximum.

15. A method of controlling power in a plasma display unit which is capable of adjusting a display brightness relative to an input image signal in accordance with an external control signal, said method comprising the steps of:

(a) detecting temperatures at parts of said plasma display unit which parts radiate heat influencing an effective maintenance frequency;

(b) selecting a maximum temperature among said temperatures;

(c) determining a maximum in a maintenance pulse number, based on both a value obtained by integrating image signal level in one frame of an input image signal, and said maximum temperature;

(d) comparing said maximum and a maintenance pulse number defined in accordance with said external control signal to each other; and (e) selecting said maximum, if said maintenance pulse number defined in accordance with said external control signal is greater than said maximum, and selecting said display brightness defined in accordance with said external control signal, if said maintenance pulse number defined in accordance with said external control signal is not greater than said maximum.

* * * * *